United States Patent
Katou et al.

(10) Patent No.: US 8,859,155 B2
(45) Date of Patent: Oct. 14, 2014

(54) FUEL CELL OPERATING METHOD AND FUEL CELL SYSTEM

(75) Inventors: Motomichi Katou, Nara (JP); Yoshikazu Tanaka, Shiga (JP); Takanori Shimada, Shiga (JP)

(73) Assignee: Panasonic Corporation, Osaka (JP)

( * ) Notice: Subject to any disclaimer, the term of this patent is extended or adjusted under 35 U.S.C. 154(b) by 31 days.

(21) Appl. No.: 13/580,591

(22) PCT Filed: Feb. 21, 2011

(86) PCT No.: PCT/JP2011/000956
§ 371 (c)(1), (2), (4) Date: Aug. 22, 2012

(87) PCT Pub. No.: WO2011/102147
PCT Pub. Date: Aug. 25, 2011

(65) Prior Publication Data
US 2012/0321977 A1    Dec. 20, 2012

(30) Foreign Application Priority Data
Feb. 22, 2010 (JP) ................................. 2010-035580

(51) Int. Cl.
*H01M 8/04* (2006.01)

(52) U.S. Cl.
CPC ............ *H01M 8/04955* (2013.01); *Y02B 90/16* (2013.01); *H01M 8/04992* (2013.01); *Y02E 60/50* (2013.01); *H01M 2250/405* (2013.01)
USPC .................................................... 429/429

(58) Field of Classification Search
CPC .............. H01M 8/04; H01M 8/04298; H01M 8/04313; H01M 8/04992; H01M 8/04955; H01M 2250/405
USPC ................................... 429/428–432
See application file for complete search history.

(56) References Cited

U.S. PATENT DOCUMENTS
2005/0123819 A1*  6/2005 Hiroi et al. ................ 429/36

FOREIGN PATENT DOCUMENTS

| JP | 8-273680 A | 10/1996 |
|---|---|---|
| JP | 2002-008695 A | 1/2002 |

(Continued)

OTHER PUBLICATIONS

English machine translation of Fujii et al. JP2007-323843, Dec. 2007.*

(Continued)

*Primary Examiner* — Ula C Ruddock
*Assistant Examiner* — Lisa S Park Gehrke
(74) *Attorney, Agent, or Firm* — McDermott Will & Emery LLP

(57) ABSTRACT

Included are: a basic operation plan creating section 2 configured to create a basic operation plan based on durable years (e.g., 10 years) and a durable operating time (e.g., 40000 hours) of a fuel cell 1, such that the fuel cell 1 is operated within the range of at least one of a first allowable operating time (e.g., 11 hours) per predetermined unit period (e.g., per day) and the number of durable start-ups (e.g., 4000 times) per predetermined unit period; a special operation plan creating section 3 configured to create a special operation plan such that the fuel cell 1 is operated within the range of at least one of a second allowable operating time (e.g., 20 hours) per predetermined unit period (e.g., per day) and a second allowable number of start-ups per predetermined unit period, the second allowable operating time being longer than the first allowable operating time, the second allowable number of start-ups being greater than the first allowable number of start-ups; an operation plan selecting section 4 configured to select one of the basic operation plan and the special operation plan; and a fuel cell operating section 5 configured to operate the fuel cell 1 based on the operation plan selected by the operation plan selecting section 4.

5 Claims, 6 Drawing Sheets

(56) References Cited

FOREIGN PATENT DOCUMENTS

| | | |
|---|---|---|
| JP | 2005-071627 A | 3/2005 |
| JP | 2007-042436 A | 2/2007 |
| JP | 2007-280650 A | 10/2007 |
| JP | 2007-323843 A | 12/2007 |
| JP | 2009-300061 A | 12/2009 |

OTHER PUBLICATIONS

English machine translation of Fujii JP2007-280650, Oct. 2007.*
International Search Report issued in International Application No. PCT/JP2011/000956 issued on Jun. 7, 2011.

* cited by examiner

FUEL CELL OPERATING METHOD AND FUEL CELL SYSTEM

TECHNICAL FIELD

The present invention includes a fuel cell configured to generate electricity through an electrochemical reaction between hydrogen and oxygen and to supply the electricity and heat. The present invention relates to a method of operating the fuel cell based on an operation plan that is created by taking into account predefined durable years and equipment life conditions, and relates to a fuel cell system.

BACKGROUND ART

In recent years, interest in the prevention of global warming and the reduction of $CO_2$ emission has been growing. Under such social circumstances, development has been conducted on household fuel cell co-generation systems that are equipment capable of efficiently extracting electric power and heat for household consumption from primary energy such as city gas. Such a system needs to have, for example, certain durable years (in general, 10 durable years are necessary) as commercial equipment to be installed in households.

A fuel cell stack used in such a system as above degrades proportionally to its power generation hours. With the current technology, the life of a fuel cell stack is 40000 to 50000 hours. Assume a case where the system is installed in, for example, a household. In this case, if energy saving is prioritized, it is estimated that power generation hours cumulated in ten years would be approximately 60000 to 80000 hours. As a result, the targeted 10 durable years cannot be achieved.

The above system includes a fuel reformer configured to generate hydrogen from a fuel gas, such as city gas, supplied from an existing infrastructure. Since the fuel reformer has a portion that is heated at high temperature, the possibility of fatigue breakdown is increased when start-up is repeated by a certain number of times.

With the current technology, the system reaches the end of its life after the system performs 4000 to 5000 times of start-ups. In a case where the system is installed in a household, the number of start-ups performed by the system will reach 3650 times in ten years even if the number of start-ups is assumed to be once a day. Considering that there are cases where the system performs start-ups twice or more in one day, then it is possible that the system does not last for ten years. Solving such a trade-off problem is one of the major challenges for putting fuel cell systems into practical use.

In order to solve this problem, for example, Patent Literature 1 discloses a technique in which the power generation hours and the number of start-ups per unit period are restricted and thereby 10 durable years of equipment are realized.

As another example, Patent Literature 2 discloses a fuel cell system and its operation method which take into consideration energy saving and the like.

CITATION LIST

Patent Literature

PTL 1: Japanese Laid-Open Patent Application Publication No. 2007-323843

PTL 2: Japanese Laid-Open Patent Application Publication No. 2007-280650

SUMMARY OF INVENTION

Technical Problem

However, in conventional techniques disclosed in, for example, Patent Literature 1, the power generation hours and the number of start-ups are both restricted, which may cause a situation where the system does not operate the way a user expects it to and thereby the user feels great stress.

For example, assume a case where the life of the system is 40000 power generation hours (a durable operating time) and 4000 times of start-ups (the number of durable start-ups). In this case, the power generation hours per day are approximately 11 hours, and the number of start-ups per day is 1.1 times. If electric power generation is started early in the morning, then there is a possibility that the electric power generation for the day ends by evening. In such a case, even if a user gives an instruction to perform electric power generation thereafter, the instruction will not be accepted.

The present invention has been made to solve the above-described problems of the conventional art. An object of the present invention is to make it possible to select to ease the restrictions in response to a request from a user.

Solution to Problem

In order to achieve the above object, the present invention creates a basic operation plan and a special operation plan. In the basic operation plan, predetermined restrictions are set regarding an operating time and the number of start-ups per predetermined unit period so that over predetermined durable years a fuel cell can be operated without causing the operating time to reach the durable operating time and without causing the number of start-ups to reach the number of durable start-ups, whereas in the special operation plan, the predetermined restrictions regarding the operating time and the number of start-ups are eased as compared to the basic operation plan. The fuel cell is operated based on a selected one of these operation plans.

Accordingly, for example, in a case where a professional-use fuel cell system is used, in which case the number of years for which the fuel cell stays operable is allowed to be less than usual, or in a case where a user places a priority on allowing the fuel cell to generate electric power all day rather than on extending the number of years for which the fuel cell stays operable, the special operation plan can be applied if the user agrees with an explanation that the fuel cell will become unusable before the elapse of the predetermined durable years. Therefore, for example, if the user wishes to ease the restrictions, agreeing that the ease of the restrictions will cause a reduction in the number of years for which the fuel cell stays operable, then the ease of the restrictions can be selected.

Advantageous Effects of Invention

According to the present invention, a basic operation plan is created, in which predetermined restrictions are set regarding an operating time and the number of start-ups per predetermined unit period so that a fuel cell can be operated over predetermined durable years, and also, a special operation plan is created, in which the predetermined restrictions regarding the operating time and the number of start-ups are eased as compared to the basic operation plan. The fuel cell is operated based on a selected one of these operation plans. Accordingly, for example, in a case where a professional-use fuel cell system is used, in which case the number of years for which the fuel cell stays operable is allowed to be less than usual, or in a case where a user places a priority on allowing the fuel cell to generate electric power all day rather than on extending the number of years for which the fuel cell stays operable, the special operation plan can be applied if the user agrees with an explanation that the fuel cell will become unusable before the elapse of the predetermined durable years. Therefore, for example, if the user wishes to ease the restrictions, agreeing that the ease of the restrictions will cause a reduction in the number of years for which the fuel cell stays operable, then the ease of the restrictions can be selected.

Accordingly, if the user is dissatisfied with the operation of the fuel cell based on a conventional basic operation plan due to short power generation hours and demands for increased opportunities for electric power generation, agreeing that the number of years for which the fuel cell stays operable will be reduced, such a demand from the user can be met.

In addition, assume that there is a user who wishes their power generation request to be always accepted, agreeing that the number of years for which the fuel cell stays operable will be reduced. For such a user, a system can be provided which is configured to accept a power generation instruction even after electric power generation for the day has ended.

DESCRIPTION OF EMBODIMENTS

Figure 1:
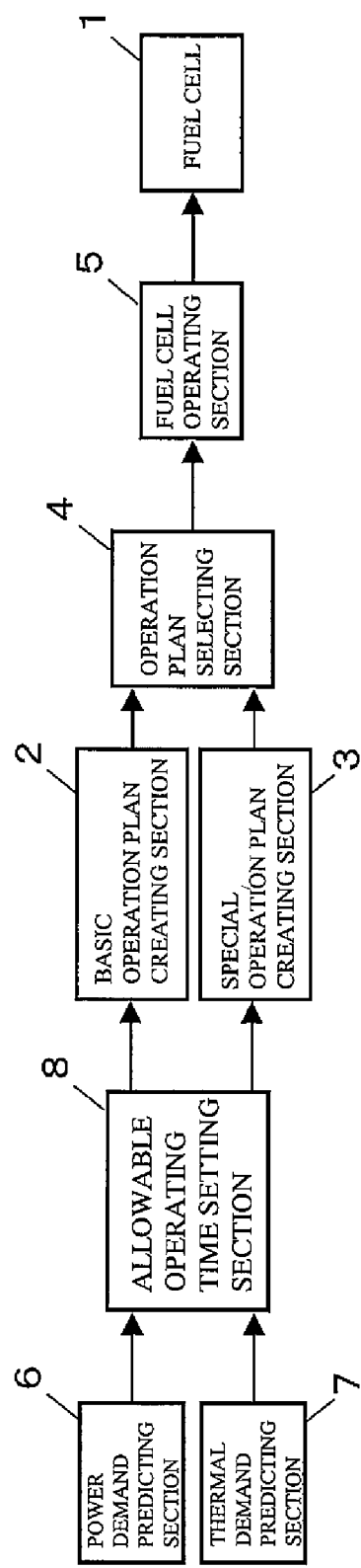
FIG. 1 is a block diagram showing an example of a schematic configuration of a fuel cell system according to Embodiment 1 of the present invention.

A first aspect of the present invention is a method of operating a fuel cell system including a fuel cell unit configured to supply electricity and heat. The method includes: a basic operation plan creating step of creating a basic operation plan based on durable years and at least one of a durable operating time and a number of durable start-ups of the fuel cell unit, such that the fuel cell unit is operated within a range of at least one of a first allowable operating time and a first allowable number of start-ups per predetermined unit period; a special operation plan creating step of creating a special operation plan such that the fuel cell unit is operated within a range of at least one of a second allowable operating time and a second allowable number of start-ups per predetermined unit period, the second allowable operating time being longer than the first allowable operating time, the second allowable number of start-ups being greater than the first allowable number of start-ups; an operation plan selecting step of selecting one of the basic operation plan and the special operation plan; and a fuel cell operating step of operating the fuel cell unit based on an operation plan selected in the operation plan selecting step.

According to the above method of operating the fuel cell, for example, if an installer (i.e., a service person) selects the basic operation plan in the operation plan selecting step, then the fuel cell is operated based on the basic operation plan in the fuel cell operating step; and if the installer (service person) selects the special operation plan in the operation plan selecting step, with a user's agreement that the end of equipment life will be reached before the elapse of predetermined durable years (the wording, 'the end of equipment life is reached', refers to one of the following conditions being satisfied: the operating time reaches the durable operating time, and the number of start-ups reaches the number of durable start-ups; the same hereinafter), then the fuel cell is operated based on the special operation plan in the fuel cell operating step.

Accordingly, in a case where the user feels dissatisfied with the operation of the fuel cell based on the basic operation plan since the power generation hours of the fuel cell are short, the user is allowed to select the operation of the fuel cell that is based on the special operation plan in which the allowable operating time is set to be longer, with an understanding that the end of equipment life will be reached before the elapse of the durable years. Thus, the user is allowed to have a wider range of options and does not feel stress.

A second aspect of the present invention is such that, particularly in the first aspect, the method of operating the fuel cell includes: a power utilizing step of utilizing electric power generated by the fuel cell unit; a power demand predicting step of predicting a power demand for electric power to be used; a heat utilizing step of storing hot water heated by utilizing heat generated when the electric power is generated and using the hot water; a thermal demand predicting step of predicting a hot water demand for hot water to be used; and either an allowable operating time setting step of setting the second allowable operating time in accordance with at least one of the power demand and the hot water demand, or an allowable number of start-ups setting step of setting the second allowable number of start-ups in accordance with at least one of the power demand and the hot water demand.

According to the above method of operating the fuel cell, a selected one of the first allowable operating time and the second allowable operating time is set as the longest operating time per predetermined unit period, or a selected one of the first allowable number of start-ups and the second allowable number of start-ups is set as the maximum number of start-ups per predetermined unit period. The operation of the fuel cell based on at least the special operation plan out of the basic operation plan and the special operation plan accords with a power demand or thermal demand of a household where the fuel cell system is installed. Therefore, a system can be constructed which carries out the most efficient operation plan based on profiles of a power load and a thermal energy load of the household.

A third aspect of the present invention is such that particularly the allowable operating time setting step in the second aspect includes setting the first allowable operating time and the second allowable operating time in accordance with at least one of the power demand and the hot water demand.

A fourth aspect of the present invention is such that particularly the allowable number of start-ups setting step in the second aspect includes setting the first allowable number of start-ups and the second allowable number of start-ups in accordance with at least one of the power demand and the hot water demand.

A fifth aspect of the present invention is a fuel cell system including a fuel cell unit configured to supply electricity and heat. The fuel cell system includes: a basic operation plan creating section configured to create a basic operation plan based on durable years and at least one of a durable operating time and a number of durable start-ups of the fuel cell unit, such that the fuel cell unit is operated within a range of at least one of a first allowable operating time and a first allowable number of start-ups per predetermined unit period; a special operation plan creating section configured to create a special operation plan such that the fuel cell unit is operated within a range of at least one of a second allowable operating time and a second allowable number of start-ups per predetermined unit period, the second allowable operating time being longer than the first allowable operating time, the second allowable number of start-ups being greater than the first allowable number of start-ups; an operation plan selecting section configured to select one of the basic operation plan and the special operation plan; and a fuel cell operating section configured to operate the fuel cell unit based on an operation plan selected by the operation plan selecting section.

According to the fuel cell system with the above-described configuration, for example, if an installer (i.e., a service person) selects the basic operation plan by means of the operation plan selecting section, then the fuel cell operating section operates the fuel cell based on the basic operation plan; and if the installer (service person) selects the special operation plan by means of the operation plan selecting section, with a user's agreement that the end of equipment life will be reached before the elapse of predetermined durable years, then the fuel cell operating section operates the fuel cell based on the special operation plan.

Accordingly, in a case where the user feels dissatisfied with the operation of the fuel cell based on the basic operation plan since the power generation hours of the fuel cell are short, the user is allowed to select the operation of the fuel cell that is based on the special operation plan in which the allowable operating time is set to be longer, with an understanding that the end of equipment life will be reached before the elapse of the durable years. Thus, the user is allowed to have a wider range of options and does not feel stress.

A sixth aspect of the present invention is such that, particularly in the fifth aspect, the fuel cell system is configured to generate ready-for-use electric power by the fuel cell unit and to store ready-for-use hot water heated by utilizing heat generated when the electric power is generated. The fuel cell system includes: a power demand predicting section configured to predict a power demand for electric power to be used; a thermal demand predicting section configured to predict a hot water demand for hot water to be used; and either an allowable operating time setting section configured to set the second allowable operating time in accordance with at least one of the power demand and the hot water demand, or an allowable number of start-ups setting section configured to set the second allowable number of start-ups in accordance with at least one of the power demand and the hot water demand.

According to the fuel cell system with the above-described configuration, a selected one of the first allowable operating time and the second allowable operating time is set as the longest operating time per predetermined unit period, or a selected one of the first allowable number of start-ups and the second allowable number of start-ups is set as the maximum number of start-ups per predetermined unit period. The operation of the fuel cell based on at least the special operation plan out of the basic operation plan and the special operation plan accords with a power demand or thermal demand of a household where the fuel cell system is installed. Therefore, a system can be constructed which carries out the most efficient operation plan based on profiles of a power load and a thermal energy load of the household.

A seventh aspect of the present invention is such that, particularly in the sixth aspect, the allowable operating time setting section sets the first allowable operating time and the second allowable operating time in accordance with at least one of the power demand and the hot water demand.

An eighth aspect of the present invention is such that, particularly in the sixth aspect, the allowable number of start-ups setting section sets the first allowable number of start-ups and the second allowable number of start-ups in accordance with at least one of the power demand and the hot water demand.

A ninth aspect of the present invention is such that, particularly in the fifth to eighth aspects, the fuel cell system includes the operation plan selecting section in a remote controller configured to communicate with the fuel cell unit.

Accordingly, the operation of the fuel cell based on the basic operation plan can be switched to the operation of the fuel cell based on the special operation plan, or vice versa, by means of the remote controller which is installed indoors.

It is desired that the selection by means of the operation plan selecting section is rendered unperformable by the user though a normal operation using the remote controller, but performable only by the installer through a special operation. This makes it possible to prevent an occurrence of a situation where the user switches the operation of the fuel cell to the operation based on the special operation plan, without understanding that the equipment life will be shortened (the wording, 'the equipment life is shortened', refers to one of the followings: the operating time reaches the durable operating time earlier than originally scheduled, and the number of start-ups reaches the number of durable start-ups earlier than originally scheduled; the same hereinafter). When the user feels dissatisfied with the operation of the fuel cell based on the basic operation plan regarding either the operating time of the fuel cell per predetermined unit period (e.g., per day, per week, or per month) or the number of start-ups of the fuel cell per predetermined unit period (e.g., per day, per week, or per month), the installer explains to the user that although it is technically possible to ease the restriction regarding the operating time or the number of start-ups, such ease of the restriction will result in that the end of equipment life is reached before the elapse of the durable years. With the user's agreement (consent) on this matter, the installer can switch the operation of the fuel cell to the operation based on the special operation plan by means of the operation plan selecting section of the remote controller. This makes it possible to prevent an occurrence of the user's dissatisfaction or a trouble in a case where the system stops operating when the end of equipment life is reached earlier than originally scheduled.

A tenth aspect of the present invention is such that, particularly in the fifth to eighth aspects, the fuel cell system includes the operation plan selecting section in a main body setting portion of the fuel cell main body.

Accordingly, the operation of the fuel cell based on the basic operation plan can be switched to the operation of the fuel cell based on the special operation plan, or vice versa, by means of the main body setting portion of the fuel cell main body, which is normally installed outdoors and is very unlikely to be operated by the user.

Since the operation plan selecting section is included in the main body setting portion of the fuel cell main body, the operation plan selecting section is very unlikely to be operated by the user. When the user feels dissatisfied with the operation of the fuel cell based on the basic operation plan regarding either the operating time of the fuel cell per predetermined unit period (e.g., per day, per week, or per month) or the number of start-ups of the fuel cell per predetermined unit period (e.g., per day, per week, or per month), the installer explains to the user that although it is technically possible to ease the restriction regarding the operating time or the number of start-ups, such ease of the restriction will result in that the end of equipment life is reached before the elapse of the durable years. With the user's agreement (consent) on this matter, the installer can switch the operation of the fuel cell to the operation based on the special operation plan by means of the operation plan selecting section of the main body setting portion of the fuel cell main body. This makes it possible to prevent an occurrence of the user's dissatisfaction or a trouble in a case where the system stops operating when the end of equipment life is reached earlier than originally scheduled.

Yet another aspect of the present invention is a method of operating a fuel cell system including a fuel cell unit configured to supply electricity and heat, the method including: a basic operation plan creating step of creating a basic operation plan based on durable years and a durable operating time of the fuel cell unit, such that the fuel cell unit is operated within a range of a first allowable operating time per predetermined unit period; a special operation plan creating step of creating a special operation plan such that the fuel cell unit is operated within a range of a second allowable operating time per predetermined unit period, the second allowable operating time being longer than the first allowable operating time; an operation plan selecting step of selecting one of the basic operation plan and the special operation plan; and a fuel cell operating step of operating the fuel cell unit based on an operation plan selected in the operation plan selecting step.

Yet another aspect of the present invention is a method of operating a fuel cell system including a fuel cell unit configured to supply electricity and heat, the method including: a basic operation plan creating step of creating a basic operation plan based on durable years and a number of durable start-ups of the fuel cell unit, such that the fuel cell unit is operated within a range of a first allowable number of start-ups per predetermined unit period; a special operation plan creating step of creating a special operation plan such that the fuel cell unit is operated within a range of a second allowable number of start-ups per predetermined unit period, the second allowable number of start-ups being greater than the first allowable number of start-ups; an operation plan selecting step of selecting one of the basic operation plan and the special operation plan; and a fuel cell operating step of operating the fuel cell unit based on an operation plan selected in the operation plan selecting step.

Yet another aspect of the present invention is a fuel cell system including a fuel cell unit configured to supply electricity and heat, the fuel cell system including: a basic operation plan creating section configured to create a basic operation plan based on durable years and a durable operating time of the fuel cell unit, such that the fuel cell unit is operated within a range of a first allowable operating time per predetermined unit period; a special operation plan creating section configured to create a special operation plan such that the fuel cell unit is operated within a range of a second allowable operating time per predetermined unit period, the second allowable operating time being longer than the first allowable operating time; an operation plan selecting section configured to select one of the basic operation plan and the special operation plan; and a fuel cell operating section configured to operate the fuel cell unit based on an operation plan selected by the operation plan selecting section.

Yet another aspect of the present invention is a fuel cell system including a fuel cell unit configured to supply electricity and heat, the fuel cell system including: a basic operation plan creating section configured to create a basic operation plan based on durable years and a number of durable start-ups of the fuel cell unit, such that the fuel cell unit is operated within a range of a first allowable number of start-ups per predetermined unit period; a special operation plan creating section configured to create a special operation plan such that the fuel cell unit is operated within a range of a second allowable number of start-ups per predetermined unit period, the second allowable number of start-ups being greater than the first allowable number of start-ups; an operation plan selecting section configured to select one of the basic operation plan and the special operation plan; and a fuel cell operating section configured to operate the fuel cell unit based on an operation plan selected by the operation plan selecting section.

Hereinafter, the fuel cell system according to the present invention and embodiments of the method of operating the fuel cell system are described with reference to the drawings. It should be noted that the present invention is not limited by these embodiments. In each embodiment, the same components as those described in a preceding embodiment are denoted by the same reference signs as those used in the preceding embodiment, and a detailed description of such components is omitted.

Embodiment 1

FIG. 1 is a block diagram of a fuel cell system according to Embodiment 1 of the present invention.

The fuel cell system according to the present invention, and a fuel cell system to which the fuel cell operating method according to the present invention is applied, include a fuel cell configured to generate electric power through an electrochemical reaction between hydrogen and oxygen. The electric power generated by the fuel cell is converted into a form suitable for household use (also suitable for use by non-household consumers or demanders consuming the electric power generated by the fuel cell; the same hereinafter) and the converted electric power can be used by a household, and also, heat generated when the electric power is generated is utilized to heat water and the resultant hot water is stored ready for use. The fuel cell system stops when a preset condition is satisfied (e.g., when the operating time of the system reaches a durable operating time which is 40000 hours, or when the number of start-ups of the system reaches the number of durable start-ups which is 4000 times, or when the duration of equipment use reaches durable years which are 10 years).

The term "operating time" refers to a period of time over which the fuel cell actually generates electric power. For example, if the fuel cell generates electric power for total 5 hours in a day, the operating time of the day is 5 hours.

The term "the number of start-ups" refers to the number of times of start-up operations performed by the fuel cell system.

The term "duration of equipment use" refers to the number of years elapsed from the start of the use of the fuel cell. Therefore, the duration of equipment use increases even during a period in which the fuel cell is not operated at all.

The term "durable operating time" refers to a period of time over which the fuel cell system is designed to stay operable. The durable operating time is calculated as an operating time cumulated from the start of the use of the fuel cell system.

The term "durable years" refers to the number of years over which the fuel cell system is designed to stay operable. The durable years are calculated as the number of years elapsed from the start of the use of the fuel cell system.

The term "the number of durable start-ups" refers to the number of times of start-ups the fuel cell system is designed to be able to perform. The number of durable start-ups is calculated as the number of start-ups cumulated from the start of the use of the fuel cell system.

As shown in FIG. 1, the fuel cell system according to the present embodiment includes: a fuel cell 1 (fuel cell unit) configured to generate electricity through an electrochemical reaction between hydrogen and oxygen and to supply the electricity and heat; a basic operation plan creating section 2 configured to create a basic operation plan based on the durable years (e.g., 10 years) and the durable operating time (e.g., 40000 hours) of the fuel cell 1, such that the fuel cell 1 is operated within the range of a first allowable operating time (e.g., 11 hours) per predetermined unit period (e.g., per day); a special operation plan creating section 3 configured to create a special operation plan such that the fuel cell 1 is operated within the range of a second allowable operating time (e.g., 20 hours) per predetermined unit period (e.g., per day), the second allowable operating time being longer than the first allowable operating time, with an agreement that the end of equipment life will be reached before the elapse of the durable years (e.g., 10 years); an operation plan selecting section 4 configured to select one of the basic operation plan and the special operation plan; a fuel cell operating section 5 configured to operate the fuel cell 1 based on the operation plan selected by the operation plan selecting section 4; a power demand predicting section 6 configured to predict a power demand for household use; a thermal demand predicting section 7 configured to predict a hot water demand (which refers to a hot water thermal demand; the same hereinafter) for household use; and an allowable operating time setting section 8 configured to set both the first allowable operating time and the second allowable operating time in accordance with both the demand value of the power demand predicted by the power demand predicting section 6 and the demand value of the hot water demand predicted by the thermal demand predicting section 7.

It should be noted that the unit period is set to one day as merely an example. The unit period may be a different period. For example, the unit period may be one week or one month (the same is true for variations of the present embodiment as well as the other embodiments below).

The basic operation plan creating section 2, the special operation plan creating section 3, the operation plan selecting section 4, the fuel cell operating section 5, the power demand predicting section 6, the thermal demand predicting section 7, and the allowable operating time setting section 8 may be realized by one or a plurality of control devices, for example. Such a control device may include, for example, a microcontroller, MPU, PLC (Programmable Logic Controller), or a logic circuit, and may additionally include a storage device such as a RAM or ROM. The control device may be configured as a single controller performing centralized control, or the control devices may be configured as a group of multiple controllers performing distributed control in cooperation with each other. For example, the basic operation plan creating section 2, the special operation plan creating section 3, the operation plan selecting section 4, the fuel cell operating section 5, the power demand predicting section 6, the thermal demand predicting section 7, and the allowable operating time setting section 8 may be entirely realized by one controller. Alternatively, controllers may be provided such that each controller corresponds to a respective one of these sections. Further alternatively, in a case where these sections form combinations of sections, one or a plurality of controllers may be provided for each of these combinations.

Figure 2:
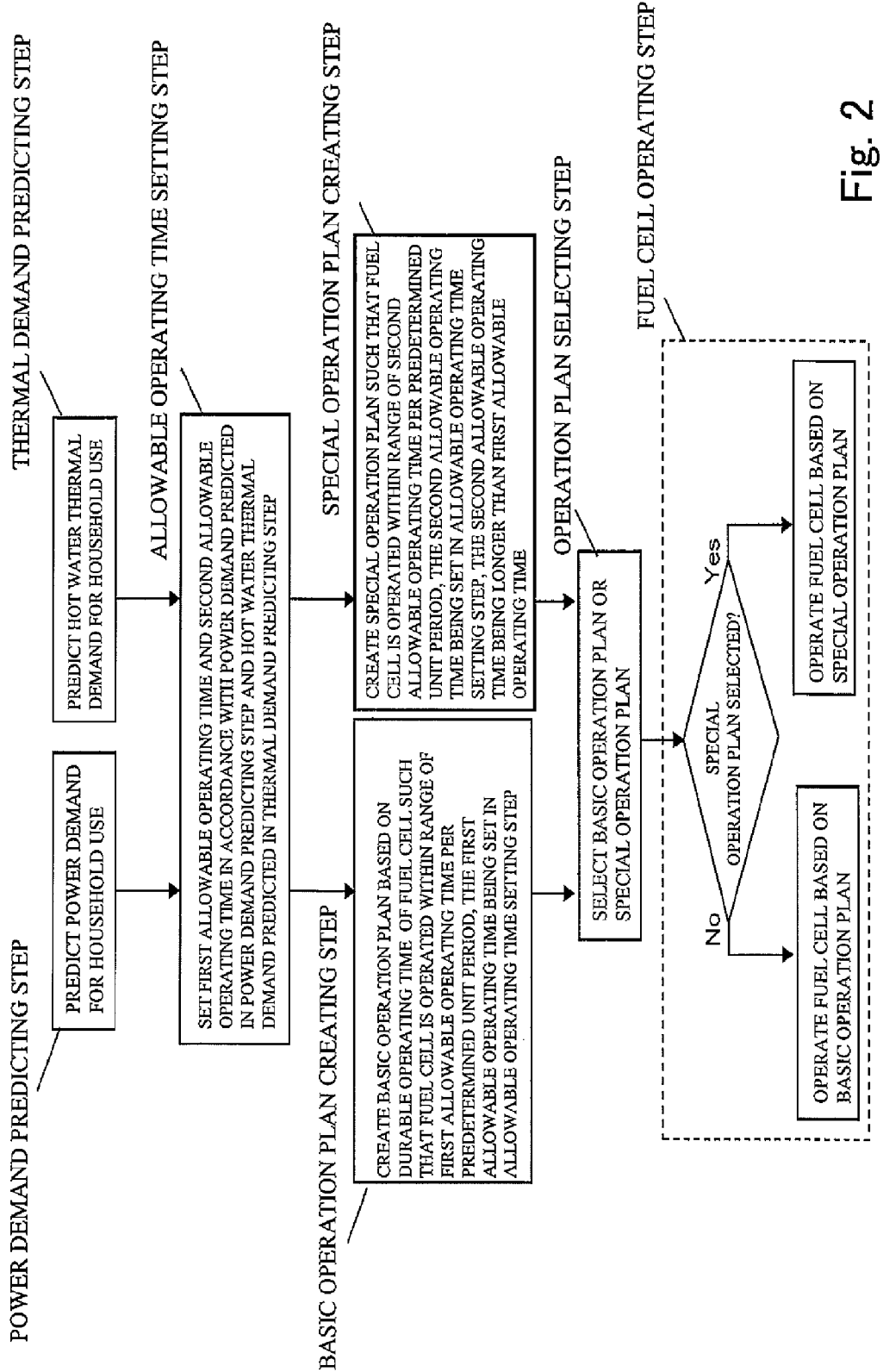
FIG. 2 is a flowchart showing an example of a method of operating a fuel cell in the fuel cell system according to Embodiment 1 of the present invention.

FIG. 2 is a flowchart showing a method of operating the fuel cell in the fuel cell system according to Embodiment 1 of the present invention.

As shown in FIG. 2, the method of operating the fuel cell in the fuel cell system according to the present embodiment includes: a basic operation plan creating step of creating a basic operation plan based on the durable years (e.g., 10 years) and the durable operating time (e.g., 40000 hours) of the fuel cell 1 (fuel cell unit) which is configured to generate electricity through an electrochemical reaction between hydrogen and oxygen and to supply the electricity and heat, such that the fuel cell 1 is operated within the range of the first allowable operating time (e.g., 11 hours) per predetermined unit period (e.g., per day); a special operation plan creating step of creating a special operation plan such that the fuel cell 1 is operated within the range of the second allowable operating time (e.g., 20 hours) per predetermined unit period (e.g., per day), the second allowable operating time being longer than the first allowable operating time, with an agreement that the end of equipment life will be reached before the elapse of the durable years (e.g., 10 years); an operation plan selecting step of selecting one of the basic operation plan and the special operation plan; a fuel cell operating step of operating the fuel cell 1 based on the operation plan selected in the operation plan selecting step; a generated power utilizing step (not shown) of converting electric power generated by the fuel cell 1 into a form suitable for household use and utilizing the converted electric power at a household; a power demand predicting step of predicting a power demand for household use; a recovered heat utilizing step (not shown) of storing hot water heated by utilizing heat generated when the electric power is generated and using the hot water; a thermal demand predicting step of predicting a hot water demand for household use; and an allowable operating time setting step of setting both the first allowable operating time and the second allowable operating time in accordance with the power demand predicted in the power demand predicting step and the hot water demand predicted in the thermal demand predicting step.

For example, assume that the durable operating time of the fuel cell 1 is 40000 hours, the number of durable start-ups of the fuel cell 1 is 4000 times, and equipment is generally required to have 10 durable years, then an allowable operating time per day is 11 hours on average and the number of start-ups performable per day is once.

The basic operation plan creating section 2 predicts profiles of a power load and a thermal load to be used by a household for the day (i.e., a power demand and a hot water demand), and determines an operating time for the day so that the greatest energy merit can be obtained while setting 11 hours as the upper limit of the operating time. Since a publicly known method (e.g., a method disclosed in Patent Literature 1 or Patent Literature 2 mentioned above) can be used as a method of creating the basic operation plan, a detailed description of the method is omitted.

In general, it is said that a household power load becomes great during the following periods: a period from a time in the morning when housework begins till noon; and a period from evening to night. Assume a case where the fuel cell system starts to be operated from six in the morning. In this case, if the allowable operating time is 11 hours, then the operation ends at five in the afternoon (the system cannot be temporarily stopped since the number of start-ups performable per day is once).

If the fuel cell system cannot be operated during power load peak hours from evening to night, then although such situation is necessary for realizing 10 durable years, it is possible that a user feels great dissatisfaction and stress with the equipment since electric power generation cannot be performed when a large amount of electric power is being used.

In view of this, the fuel cell system according to the present embodiment includes the special operation plan creating section 3 which performs the followings: ease the restriction regarding the allowable operating time per day to a great extent, for example, increase the allowable operating time per day to 20 hours; predict profiles of a power load and a thermal load to be used by a household for the day; and determine an operating time for the day so that the greatest energy merit can be obtained while setting 20 hours as the upper limit of the operating time. Specifically, the special operation plan may be created, for example, in the same method as the basic operation plan creation method in a case where the allowable operating time is set to 20 hours. Therefore, a detailed description of the special operation plan creation method is omitted.

However, if the fuel cell 1 is always operated based on the special operation plan created by the special operation plan creating section 3, in which the fuel cell 1 is operated within the range of 20 hours per day, then the equipment life is shortened significantly since the operating time is maximum 20 hours per day.

Accordingly, the basic equipment configuration is made such that the operation of the fuel cell 1 based on the basic operation plan created by the basic operation plan creating section 2 is selected. According to the basic operation plan, the fuel cell 1 is operated within the range of 11 hours per day. Then, upon customer request, the installer of the fuel cell system changes its settings to select the operation of the fuel cell 1 based on the special operation plan, with the customer's agreement that the equipment life will be shortened. Specifically, for example, it is conceivable to display the following message on a touch panel display: "The equipment life will be shortened if operated based on the special operation plan". In this case, buttons (e.g., "SELECT" and "NOT SELECT") may be displayed, which allow the user to select whether or not to perform the operation based on the special operation plan even though the equipment life will be shortened. Then, whether or not to perform the operation based on the special operation plan may be determined when the user presses one of these buttons. Gaining the agreement that the equipment life will be shortened is not essential. The system may be configured such that the special operation plan can be selected without gaining the agreement.

Each of the basic operation plan and the special operation plan includes, for example, one start-up time and one stop time, or two start-up times and two stop times. In the fuel cell operating step, the fuel cell 1 is started at the start-up time and the operation of the fuel cell 1 is stopped at the stop time.

As described above, the fuel cell system according to the present embodiment includes the fuel cell 1, which is configured to generate electricity through an electrochemical reaction between hydrogen and oxygen and to supply the electricity and heat. The fuel cell system is configured to stop when a preset condition is satisfied (e.g., when the operating time reaches the durable operating time which is 40000 hours, or when the number of start-ups reaches the number of durable start-ups which is 4000 times, or when the duration of equipment use reaches 10 years). The fuel cell system includes: the basic operation plan creating section 2 configured to create the basic operation plan based on the durable years (e.g., 10 years) and the durable operating time (e.g., 40000 hours) of the fuel cell 1, such that the fuel cell 1 is operated within the range of the first allowable operating time (e.g., 11 hours) per predetermined unit period (e.g., per day); the special operation plan creating section 3 configured to create the special operation plan such that the fuel cell 1 is operated within the range of the second allowable operating time (e.g., 20 hours) per predetermined unit period (e.g., per day), the second allowable operating time being longer than the first allowable operating time, with an agreement that the end of equipment life will be reached before the elapse of the durable years (e.g., 10 years); the operation plan selecting section 4 configured to select one of the basic operation plan and the special operation plan; and the fuel cell operating section 5 configured to operate the fuel cell 1 based on the operation plan selected by the operation plan selecting section 4.

In the fuel cell system with the above-described configuration, the basic operation plan creating section 2 creates the basic operation plan based on the durable years (e.g., 10 years) and the durable operating time (e.g., 40000 hours) of the fuel cell 1, such that the fuel cell 1 is operated within the range of the first allowable operating time (e.g., 11 hours) per predetermined unit period (e.g., per day), and the special operation plan creating section 3 creates the special operation plan such that the fuel cell 1 is operated within the range of the second allowable operating time (e.g., 20 hours) per predetermined unit period (e.g., per day), the second allowable operating time being longer than the first allowable operating time (e.g., 11 hours). For example, if an installer (i.e., a service person) selects the basic operation plan by means of the operation plan selecting section 4, then the fuel cell operating section 5 operates the fuel cell 1 based on the basic operation plan. Also, if the installer (service person) selects the special operation plan by means of the operation plan selecting section 4, with the user's agreement that the end of equipment life will be reached before the elapse of the durable years (e.g., 10 years), then the fuel cell operating section 5 operates the fuel cell 1 based on the special operation plan.

Accordingly, in a case where the user feels dissatisfied with the operation of the fuel cell 1 based on the basic operation plan since the power generation hours of the fuel cell 1 are short, the user is allowed to select the operation of the fuel cell 1 that is based on the special operation plan in which the allowable operating time is set to be longer, with an understanding that the end of equipment life will be reached before the elapse of the durable years (e.g., 10 years). Thus, the user is allowed to have a wider range of options and does not feel stress.

The fuel cell system according to the present embodiment converts the electric power generated by the fuel cell 1 into a form suitable for household use, and the converted electric power can be used by a household. Also, the fuel cell system stores hot water heated by utilizing heat generated when the electric power is generated, and the hot water is stored ready for use. The fuel cell system includes: the power demand predicting section 6 configured to predict a power demand for household use; the thermal demand predicting section 7 configured to predict a hot water demand for household use; and the allowable operating time setting section 8 configured to set at least the second allowable operating time out of the first allowable operating time and the second allowable operating time (in the present embodiment, both the first allowable operating time and the second allowable operating time) in accordance with the demand value of at least one of the power demand predicted by the power demand predicting section 6 and the hot water demand predicted by the thermal demand predicting section 7 (in the present embodiment, both the power demand and the thermal demand).

In the fuel cell system with the above-described configuration, the allowable operating time setting section 8 sets at least the second allowable operating time out of the first allowable operating time and the second allowable operating time (in the present embodiment, both the first allowable operating time and the second allowable operating time) in accordance with the demand value of at least one of the power demand predicted by the power demand predicting section 6 and the hot water demand predicted by the thermal demand predicting section 7 (in the present embodiment, both the power demand and the thermal demand).

Accordingly, a selected one of the first allowable operating time and the second allowable operating time is set as the longest operating time per predetermined unit period (e.g., per day), and the operation of the fuel cell 1 based on at least the special operation plan out of the basic operation plan and the special operation plan accords with a power demand or thermal demand of a household where the fuel cell system is installed. Therefore, a system can be constructed which carries out the most efficient operation plan based on profiles of a power load and a thermal energy load of the household.

As described above, the method of operating the fuel cell in the fuel cell system according to the present embodiment includes: the basic operation plan creating step of creating the basic operation plan based on the durable years (e.g., 10 years) and the durable operating time (e.g., 40000 hours) of the fuel cell 1 which is configured to generate electricity through an electrochemical reaction between hydrogen and oxygen and to supply the electricity and heat, such that the fuel cell 1 is operated within the range of the first allowable operating time (e.g., 11 hours) per predetermined unit period (e.g., per day); the special operation plan creating step of creating the special operation plan such that the fuel cell 1 is operated within the range of the second allowable operating time (e.g., 20 hours) per predetermined unit period (e.g., per day), the second allowable operating time being longer than the first allowable operating time, with an agreement that the end of equipment life will be reached before the elapse of the durable years (e.g., 10 years); the operation plan selecting step of selecting one of the basic operation plan and the special operation plan; and the fuel cell operating step of operating the fuel cell 1 based on the operation plan selected in the operation plan selecting step.

In the above-described method of operating the fuel cell 1, in the basic operation plan creating step, the basic operation plan is created based on the durable years (e.g., 10 years) and the durable operating time (e.g., 40000 hours) of the fuel cell 1, such that the fuel cell 1 is operated within the range of the first allowable operating time (e.g., 11 hours) per predetermined unit period (e.g., per day); and in the special operation plan creating step, the special operation plan is created such that the fuel cell 1 is operated within the range of the second allowable operating time (e.g., 20 hours) per predetermined unit period (e.g., per day), the second allowable operating time being longer than the first allowable operating time. For example, if an installer (i.e., a service person) selects the basic operation plan in the operation plan selecting step, then the fuel cell 1 is operated based on the basic operation plan in the fuel cell operating step. Also, if the installer (service person) selects the special operation plan in the operation plan selecting step, with the user's agreement that the end of equipment life will be reached before the elapse of the durable years (e.g., 10 years), then the fuel cell 1 is operated based on the special operation plan in the fuel cell operating step.

Accordingly, in a case where the user feels dissatisfied with the operation of the fuel cell based on the basic operation plan since the power generation hours are short, the user is allowed to select the operation of the fuel cell 1 that is based on the special operation plan in which the allowable operating time is set to be longer, with an understanding that the end of equipment life will be reached before the elapse of the durable years (e.g., 10 years). Thus, the user is allowed to have a wider range of options and does not feel stress.

The method of operating the fuel cell in the fuel cell system according to the present embodiment includes: the generated power utilizing step of converting the electric power generated by the fuel cell 1 into a form suitable for household use and utilizing the converted electric power at a household; the power demand predicting step of predicting a power demand for household use; the recovered heat utilizing step of storing hot water heated by utilizing heat generated when the electric power is generated and using the hot water; the thermal demand predicting step of predicting a hot water demand for household use; and the allowable operating time setting step of setting at least the second allowable operating time out of the first allowable operating time and the second allowable operating time (in the present embodiment, both the first allowable operating time and the second allowable operating time) in accordance with the demand value of at least one of the power demand predicted in the power demand predicting step and the hot water demand predicted in the thermal demand predicting step (in the present embodiment, both the power demand and the thermal demand).

In the above-described method of operating the fuel cell, in the allowable operating time setting step, at least the second allowable operating time out of the first allowable operating time and the second allowable operating time (in the present embodiment, both the first allowable operating time and the second allowable operating time) is set in accordance with the demand value of at least one of the power demand predicted in the power demand predicting step and the hot water demand predicted in the thermal demand predicting step (in the present embodiment, both the power demand and the thermal demand).

Accordingly, a selected one of the first allowable operating time and the second allowable operating time is set as the longest operating time per predetermined unit period, and the operation of the fuel cell based on at least the special operation plan out of the basic operation plan and the special operation plan accords with a power demand or thermal demand of a household where the fuel cell system is installed. Therefore, a system can be constructed which executes the most efficient operation plan based on profiles of a power load and a thermal energy load of the household.

It should be noted that in the fuel cell system according to the present embodiment, the power demand predicting section 6, the thermal demand predicting section 7, and the allowable operating time setting section 8 may be entirely or partially eliminated. In this case, for example, at least one of the power demand and the thermal demand may be set through manual input, and the allowable operating times may be set through manual input.

Further, in the method of operating the fuel cell system according to the present embodiment, the generated power utilizing step, the recovered heat utilizing step, the power demand predicting step, the thermal demand predicting step, and the allowable operating time setting step may be entirely or partially eliminated. In this case, for example, at least one of the power demand and the thermal demand may be set through manual input, and the allowable operating times may be set through manual input.

Embodiment 2

Figure 3:
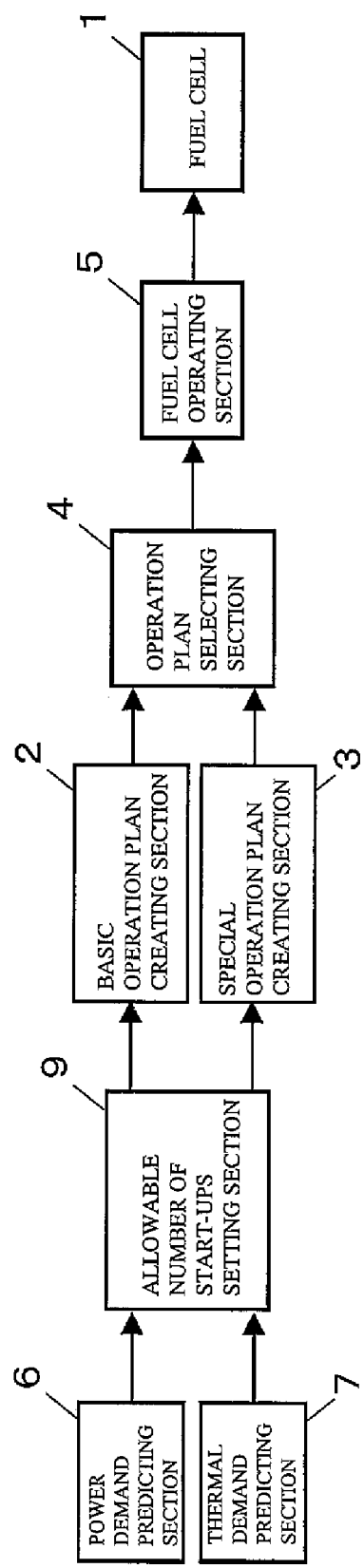
FIG. 3 is a block diagram showing an example of a schematic configuration of a fuel cell system according to Embodiment 2 of the present invention.

FIG. 3 is a block diagram showing a fuel cell system according to Embodiment 2 of the present invention.

The fuel cell system according to the present invention, and a fuel cell system to which the fuel cell operating method according to the present invention is applied, include a fuel cell configured to generate electric power through an electrochemical reaction between hydrogen and oxygen. The electric power generated by the fuel cell is converted into a form suitable for household use and the converted electric power can be used by a household, and also, heat generated when the electric power is generated is utilized to heat water and the resultant hot water is stored ready for use. The fuel cell system stops when a preset condition is satisfied (e.g., when the operating time of the system reaches the durable operating time which is 40000 hours, or when the number of start-ups of the system reaches the number of durable start-ups which is 4000 times, or when the duration of equipment use reaches 10 years).

As shown in FIG. 3, the fuel cell system according to the present embodiment includes: the fuel cell 1 configured to generate electricity through an electrochemical reaction between hydrogen and oxygen and to supply the electricity and heat; the basic operation plan creating section 2 configured to create a basic operation plan based on the durable years (e.g., 10 years) and the number of durable start-ups (e.g., 4000 times) of the fuel cell 1, such that the fuel cell 1 is operated within the range of a first allowable number of start-ups (e.g., once) per predetermined unit period (e.g., per day); the special operation plan creating section 3 configured to create a special operation plan such that the fuel cell 1 is operated within the range of a second allowable number of start-ups (e.g., twice) per predetermined unit period (e.g., per day), the second allowable number of start-ups being increased compared to the first allowable number of start-ups, with an agreement that the end of equipment life will be reached before the elapse of the durable years (e.g., 10 years); the operation plan selecting section 4 configured to select one of the basic operation plan and the special operation plan; the fuel cell operating section 5 configured to operate the fuel cell 1 based on the operation plan selected by the operation plan selecting section 4; the power demand predicting section 6 configured to predict a power demand for household use; the thermal demand predicting section 7 configured to predict a hot water demand for household use; and an allowable number of start-ups setting section 9 configured to set both the first allowable number of start-ups and the second allowable number of start-ups in accordance with both the demand value of the power demand predicted by the power demand predicting section 6 and the demand value of the hot water demand predicted by the thermal demand predicting section 7.

The basic operation plan creating section 2, the special operation plan creating section 3, the operation plan selecting section 4, the fuel cell operating section 5, the power demand predicting section 6, the thermal demand predicting section 7, and the allowable number of start-ups setting section 9 may be realized by one or a plurality of control devices, for example. Such a control device may include, for example, a microcontroller, MPU, PLC (Programmable Logic Controller), or a logic circuit, and may additionally include a storage device such as a RAM or ROM. The control device may be configured as a single controller performing centralized control, or the control devices may be configured as a group of multiple controllers performing distributed control in cooperation with each other. For example, the basic operation plan creating section 2, the special operation plan creating section 3, the operation plan selecting section 4, the fuel cell operating section 5, the power demand predicting section 6, the thermal demand predicting section 7, and the allowable number of start-ups setting section 9 may be entirely realized by one controller. Alternatively, controllers may be provided such that each controller corresponds to a respective one of these sections. Further alternatively, in a case where these sections form combinations of sections, one or a plurality of controllers may be provided for each of these combinations.

Figure 4:
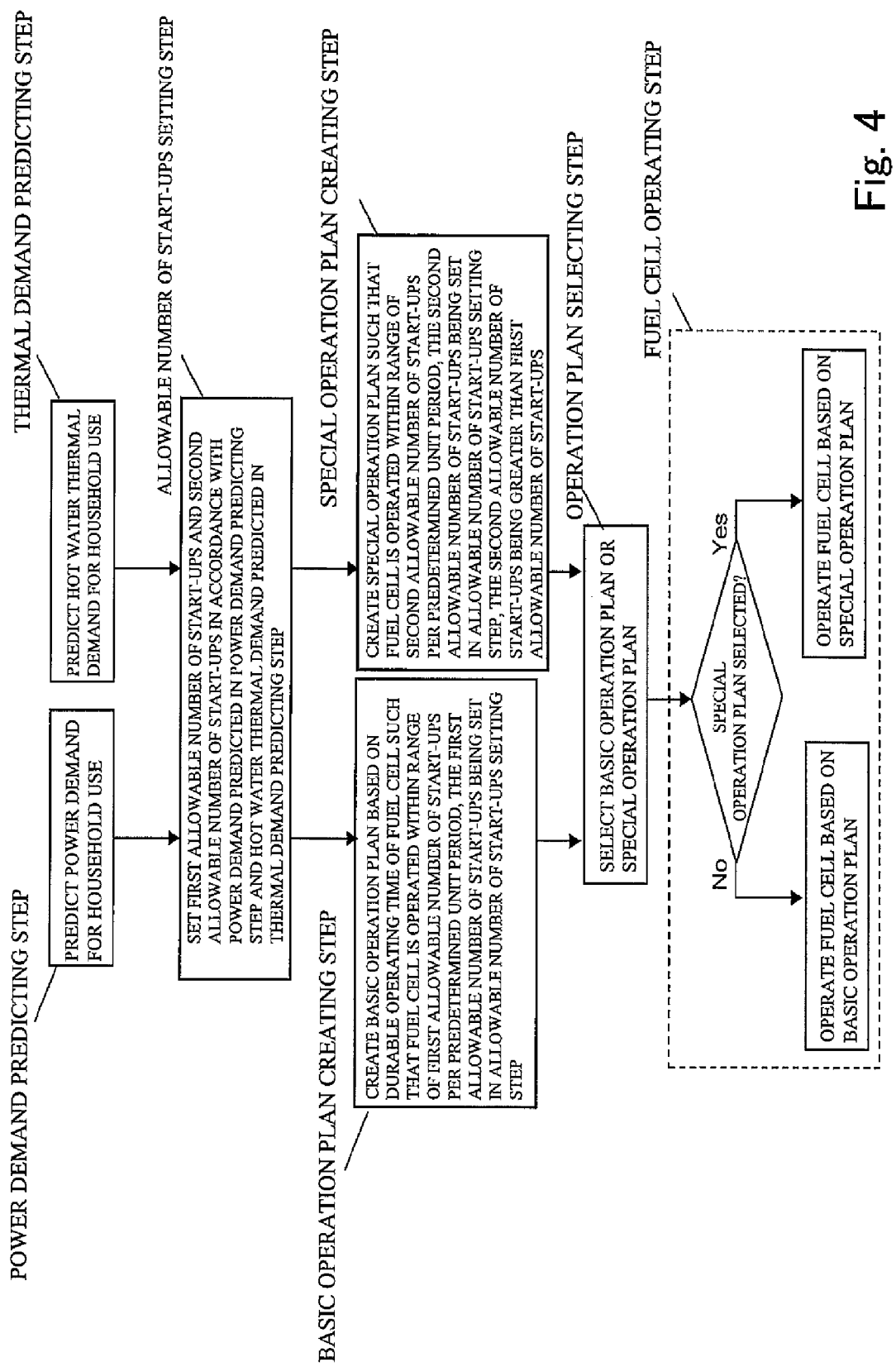
FIG. 4 is a flowchart showing an example of a method of operating a fuel cell in the fuel cell system according to Embodiment 2 of the present invention.

FIG. 4 is a flowchart showing a method of operating the fuel cell in the fuel cell system according to Embodiment 2 of the present invention.

As shown in FIG. 4, the method of operating the fuel cell in the fuel cell system according to the present embodiment includes: the basic operation plan creating step of creating a basic operation plan based on the durable years (e.g., 10 years) and the number of durable start-ups (e.g., 4000 times) of the fuel cell 1 which is configured to generate electricity through an electrochemical reaction between hydrogen and oxygen and to supply the electricity and heat, such that the fuel cell 1 is operated within the range of the first allowable number of start-ups (e.g., once) per predetermined unit period (e.g., per day); the special operation plan creating step of creating a special operation plan such that the fuel cell 1 is operated within the range of the second allowable number of start-ups (e.g., twice) per predetermined unit period (e.g., per day), the second allowable number of start-ups being increased compared to the first allowable number of start-ups, with an agreement that the end of equipment life will be reached before the elapse of the durable years (e.g., 10 years); the operation plan selecting step of selecting one of the basic operation plan and the special operation plan; the fuel cell operating step of operating the fuel cell 1 based on the operation plan selected in the operation plan selecting step; the generated power utilizing step (not shown) of converting electric power generated by the fuel cell 1 into a form suitable for household use and utilizing the converted electric power at a household; the power demand predicting step of predicting a power demand for household use; the recovered heat utilizing step (not shown) of storing hot water heated by utilizing heat generated when the electric power is generated and using the hot water; the thermal demand predicting step of predicting a hot water demand for household use; and an allowable number of start-ups setting step of setting both the first allowable number of start-ups and the second allowable number of start-ups in accordance with the power demand predicted in the power demand predicting step and the hot water demand predicted in the thermal demand predicting step.

For example, assuming that the durable operating time of the fuel cell 1 is 40000 hours, the number of durable start-ups of the fuel cell 1 is 4000 times, and equipment is generally required to have 10 durable years, then an allowable operating time per day is 11 hours on average and the number of start-ups performable per day is once.

The basic operation plan creating section 2 predicts profiles of a power load and a thermal load to be used by a household for the day (i.e., a power demand and a hot water demand), and determines an operating time for the day so that the greatest energy merit can be obtained while setting 11 hours as the upper limit of the operating time. Since a publicly known method (e.g., a method disclosed in Patent Literature 1 or Patent Literature 2 mentioned above) can be used as a method of creating the basic operation plan, a detailed description of the method is omitted.

In general, it is said that a household power load becomes great during the following periods: a period from a time in the morning when housework begins till noon; and a period from evening to night. Assume a case where the fuel cell system starts to be operated from six in the morning. In this case, if the allowable operating time is 11 hours, then the operation ends at five in the afternoon (the system cannot be temporarily stopped since the number of start-ups performable per day is once).

If the fuel cell system cannot be operated during power load peak hours from evening to night, then although such situation is necessary for realizing 10 durable years, it is possible that the user feels great dissatisfaction and stress with the equipment since electric power generation cannot be performed when a large amount of electric power is being used.

In view of this, the fuel cell system according to the present embodiment includes the special operation plan creating section 3 which performs the followings: ease the restriction regarding the allowable number of start-ups per day, for example, increase the allowable number of start-ups per day to twice; predict profiles of a power load and a thermal load to be used by a household for the day; and determine operating times for the day so that the greatest energy merit can be obtained while setting the twice per day as the upper limit of the number of start-ups. Specifically, the special operation plan may be created, for example, in the same method as the basic operation plan creation method in a case where the allowable operating time is set to 20 hours. Therefore, a detailed description of the special operation plan creation method is omitted.

However, if the fuel cell 1 is always operated based on the special operation plan created by the special operation plan creating section 3, in which the start-up of the fuel cell 1 is performed within the range of twice per day, then the equipment life is shortened significantly since the number of start-ups is maximum twice per day while the number of durable start-ups is 4000 times.

Accordingly, the basic equipment configuration is made such that the operation of the fuel cell 1 based on the basic operation plan created by the basic operation plan creating section 2 is selected. According to the basic operation plan, the fuel cell 1 is operated with the number of start-ups per day set to once. Then, upon customer request, the installer of the fuel cell system changes its settings to select the operation of the fuel cell 1 based on the special operation plan, with the customer's agreement that the equipment life will be shortened. Specifically, for example, it is conceivable to display the following message on a touch panel display: "The equipment life will be shortened if operated based on the special operation plan". In this case, buttons (e.g., "SELECT" and "NOT SELECT") may be displayed, which allow the user to select whether or not to perform the operation based on the special operation plan even though the equipment life will be shortened. Then, whether or not to perform the operation based on the special operation plan may be determined when the user presses one of these buttons. Gaining the agreement that the equipment life will be shortened is not essential. The system may be configured such that the special operation plan can be selected without gaining the agreement.

Each of the basic operation plan and the special operation plan includes, for example, one start-up time and one stop time, or two start-up times and two stop times. In the fuel cell operating step, the fuel cell 1 is started at the start-up time and the operation of the fuel cell 1 is stopped at the stop time.

As described above, the fuel cell system according to the present embodiment includes the fuel cell 1, which is configured to generate electricity through an electrochemical reaction between hydrogen and oxygen and to supply the electricity and heat. The fuel cell system is configured to stop when a preset condition is satisfied (e.g., when the operating time reaches the durable operating time which is 40000 hours, or when the number of start-ups reaches the number of durable start-ups which is 4000 times, or when the duration of equipment use reaches 10 years). The fuel cell system includes: the basic operation plan creating section 2 configured to create the basic operation plan based on the durable years (e.g., 10 years) and the number of durable start-ups (e.g., 4000 times) of the fuel cell 1, such that the fuel cell 1 is operated with the first allowable number of start-ups (e.g., once) per predetermined unit period (e.g., per day); the special operation plan creating section 3 configured to create the special operation plan such that the fuel cell 1 is operated within the range of the second allowable number of start-ups (e.g., twice) per predetermined unit period (e.g., per day), the second allowable number of start-ups being increased compared to the first allowable number of start-ups, with an agreement that the end of equipment life will be reached before the elapse of the durable years (e.g., 10 years); the operation plan selecting section 4 configured to select one of the basic operation plan and the special operation plan; and the fuel cell operating section 5 configured to operate the fuel cell 1 based on the operation plan selected by the operation plan selecting section 4.

In the fuel cell system with the above-described configuration, the basic operation plan creating section 2 creates the basic operation plan based on the durable years (e.g., 10 years) and the number of durable start-ups (e.g., 4000 times) of the fuel cell 1, such that the fuel cell 1 is operated within the range of the first allowable number of start-ups (e.g., once) per predetermined unit period (e.g., per day), and the special operation plan creating section 3 creates the special operation plan such that the fuel cell 1 is operated within the range of the second allowable number of start-ups (e.g., twice) per predetermined unit period (e.g., per day), the second allowable number of start-ups being increased compared to the first allowable number of start-ups (e.g., once). For example, if an installer (i.e., a service person) selects the basic operation plan by means of the operation plan selecting section 4, then the fuel cell operating section 5 operates the fuel cell 1 based on the basic operation plan. Also, if the installer (service person) selects the special operation plan by means of the operation plan selecting section 4, with the user's agreement that the end of equipment life will be reached before the elapse of the durable years (e.g., 10 years), then the fuel cell operating section 5 operates the fuel cell 1 based on the special operation plan.

Accordingly, in a case where the user feels dissatisfied with the operation of the fuel cell 1 based on the basic operation plan since the number of times the electric power generation can be performed is small, the user is allowed to select the operation of the fuel cell 1 that is based on the special operation plan in which the operation of the fuel cell 1 can be performed multiple times (e.g., twice) per predetermined unit period (e.g., per day), with an understanding that the end of equipment life will be reached before the elapse of the durable years (e.g., 10 years). Thus, the user is allowed to have a wider range of options and does not feel stress.

The fuel cell system according to the present embodiment converts the electric power generated by the fuel cell 1 into a form suitable for household use, and the converted electric power can be used by a household. Also, the fuel cell system stores hot water heated by utilizing heat generated when the electric power is generated, and the hot water is stored ready for use. The fuel cell system includes: the power demand predicting section 6 configured to predict a power demand for household use; the thermal demand predicting section 7 configured to predict a hot water demand for household use; and the allowable number of start-ups setting section 9 configured to set at least the second allowable number of start-ups out of the first allowable number of start-ups and the second allowable number of start-ups (in the present embodiment, both the first allowable number of start-ups and the second allowable number of start-ups) in accordance with the demand value of at least one of the power demand predicted by the power demand predicting section 6 and the hot water demand predicted by the thermal demand predicting section 7 (in the present embodiment, both the power demand and the thermal demand).

In the fuel cell system with the above-described configuration, the allowable number of start-ups setting section 9 sets at least the second allowable number of start-ups out of the first allowable number of start-ups and the second allowable number of start-ups (in the present embodiment, both the first allowable number of start-ups and the second allowable number of start-ups) in accordance with the demand value of at least one of the power demand predicted by the power demand predicting section 6 and the hot water demand predicted by the thermal demand predicting section 7 (in the present embodiment, both the power demand and the thermal demand).

Accordingly, a selected one of the first allowable number of start-ups and the second allowable number of start-ups is set as the maximum number of start-ups per predetermined unit period (e.g., per day), and the operation of the fuel cell 1 based on at least the special operation plan out of the basic operation plan and the special operation plan accords with a power demand or thermal demand of a household where the fuel cell system is installed. Therefore, a system can be constructed which carries out the most efficient operation plan based on profiles of a power load and a thermal energy load of the household.

As described above, the method of operating the fuel cell in the fuel cell system according to the present embodiment includes: the basic operation plan creating step of creating the basic operation plan based on the durable years (e.g., 10 years) and the number of durable start-ups (e.g., 4000 times) of the fuel cell 1 which is configured to generate electricity through an electrochemical reaction between hydrogen and oxygen and to supply the electricity and heat, such that the fuel cell 1 is operated within the range of the first allowable number of start-ups (e.g., once) per predetermined unit period (e.g., per day); the special operation plan creating step of creating the special operation plan such that the fuel cell 1 is operated within the range of the second allowable number of start-ups (e.g., twice) per predetermined unit period (e.g., per day), the second allowable number of start-ups being increased compared to the first allowable number of start-ups, with an agreement the end of equipment life will be reached before the elapse of the durable years (e.g., 10 years); the operation plan selecting step of selecting one of the basic operation plan and the special operation plan; and the fuel cell operating step of operating the fuel cell 1 based on the operation plan selected in the operation plan selecting step.

In the above-described method of operating the fuel cell 1, in the basic operation plan creating step, the basic operation plan is created based on the durable years (e.g., 10 years) and the number of durable start-ups (e.g., 4000 times) of the fuel cell 1, such that the fuel cell 1 is operated within the range of the first allowable number of start-ups (e.g., once) per predetermined unit period (e.g., per day); and in the special operation plan creating step, the special operation plan is created such that the fuel cell 1 is operated within the range of the second allowable number of start-ups (e.g., twice) per predetermined unit period (e.g., per day), the second allowable number of start-ups being increased compared to the first allowable number of start-ups. For example, if an installer (i.e., a service person) selects the basic operation plan in the operation plan selecting step, then the fuel cell 1 is operated based on the basic operation plan in the fuel cell operating step. Also, if the installer (service person) selects the special operation plan in the operation plan selecting step, with the user's agreement that the end of equipment life will be reached before the elapse of the durable years (e.g., 10 years), then the fuel cell 1 is operated based on the special operation plan in the fuel cell operating step.

Accordingly, in a case where the user feels dissatisfied with the operation of the fuel cell based on the basic operation plan since the number of times the electric power generation can be performed is small, the user is allowed to select the operation of the fuel cell 1 that is based on the special operation plan in which the operation of the fuel cell 1 can be performed multiple times (e.g., twice) per predetermined unit period (e.g., per day), with an understanding that the end of equipment life will be reached before the elapse of the durable years (e.g., 10 years). Thus, the user is allowed to have a wider range of options and does not feel stress.

The method of operating the fuel cell in the fuel cell system according to the present embodiment includes: the generated power utilizing step of converting the electric power generated by the fuel cell 1 into a form suitable for household use and utilizing the converted electric power at a household; the power demand predicting step of predicting a power demand for household use; the recovered heat utilizing step of storing hot water heated by utilizing heat generated when the electric power is generated and using the hot water; the thermal demand predicting step of predicting a hot water demand for household use; and the allowable number of start-ups setting step of setting at least the second allowable number of start-ups out of the first allowable number of start-ups and the second allowable number of start-ups (in the present embodiment, both the first allowable number of start-ups and the second allowable number of start-ups) in accordance with the demand value of at least one of the power demand predicted in the power demand predicting step and the hot water demand predicted in the thermal demand predicting step (in the present embodiment, both the power demand and the thermal demand).

In the above-described method of operating the fuel cell, in the allowable number of start-ups setting step, at least the second allowable number of start-ups out of the first allowable number of start-ups and the second allowable number of start-ups (in the present embodiment, both the first allowable number of start-ups and the second allowable number of start-ups) is set in accordance with the demand value of at least one of the power demand predicted in the power demand predicting step and the hot water demand predicted in the thermal demand predicting step (in the present embodiment, both the power demand and the thermal demand).

Accordingly, a selected one of the first allowable number of start-ups and the second allowable number of start-ups is set as the maximum number of start-ups per predetermined unit period, and the operation of the fuel cell based on at least the special operation plan out of the basic operation plan and the special operation plan accords with a power demand or thermal demand of a household where the fuel cell system is installed. Therefore, a system can be constructed which carries out the most efficient operation plan based on profiles of a power load and a thermal energy load of the household.

It should be noted that in the fuel cell system according to the present embodiment, the power demand predicting section 6, the thermal demand predicting section 7, and the allowable number of start-ups setting section 9 may be entirely or partially eliminated. In this case, for example, at least one of the power demand and the thermal demand may be set through manual input, and the allowable number of start-ups may be set through manual input.

Further, in the method of operating the fuel cell system according to the present embodiment, the generated power utilizing step, the recovered heat utilizing step, the power demand predicting step, the thermal demand predicting step, and the allowable number of start-ups setting step may be entirely or partially eliminated. In this case, for example, at least one of the power demand and the thermal demand may be set through manual input, and the allowable number of start-ups may be set through manual input.

Embodiment 3

Figure 5:
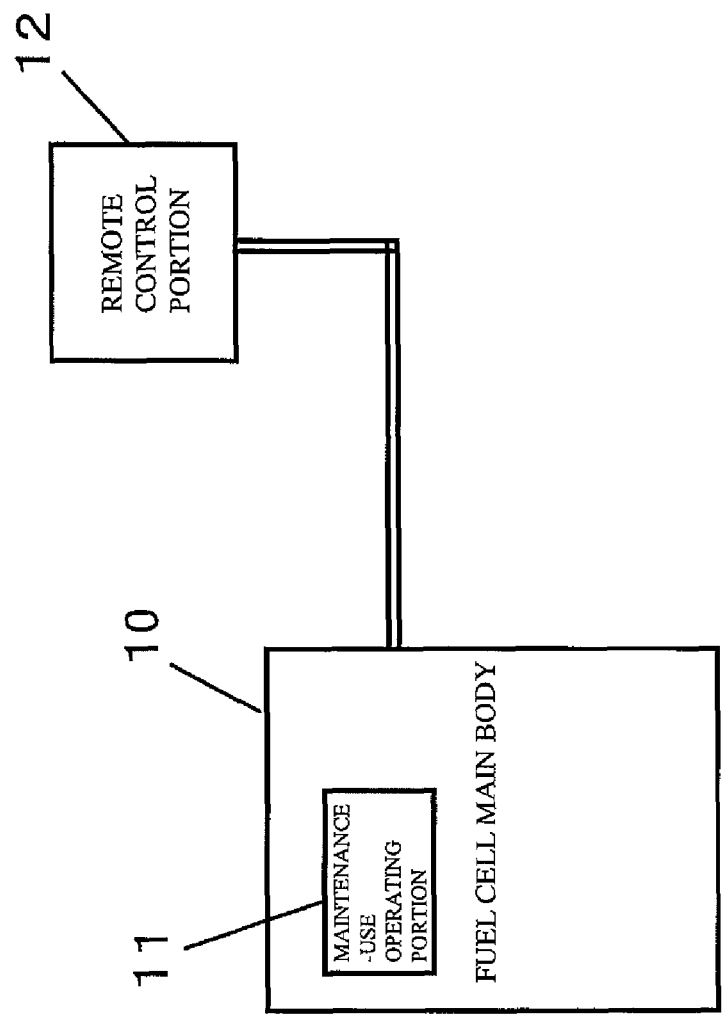
FIG. 5 is a configuration diagram showing an example of a schematic configuration a fuel cell system according to Embodiment 3 of the present invention.

FIG. 5 is a configuration diagram of a fuel cell system according to Embodiment 3 of the present invention.

As shown in FIG. 5, the fuel cell system according to the present embodiment is configured such that the configuration according to Embodiment 1 or Embodiment 2 includes: a fuel cell main body 10 (the fuel cell system according to Embodiment 1 or Embodiment 2); a maintenance-use operating portion 11 (an operating portion for maintenance) incorporated within the fuel cell main body 10; and a remote control portion 12 placed indoors and electrically connected to the fuel cell main body 10.

Here, the operation plan selecting section 4, which is configured to select between the basic operation plan creating section 2 and the special operation plan creating section 3 described in Embodiment 1 or Embodiment 2, is placed in the maintenance-use operating portion 11, because it is essential that the setting to select the special operation plan creating section 3 is performed by the installer in response to a customer request, with the customer's agreement that the equipment life will be shortened, and therefore, the operation plan selecting section 4 needs to be placed at such a position as not to allow the customer to perform such setting.

The remote control portion 12 which is normally operated by the customer is placed indoors, and the maintenance-use operating portion 11 which is normally operated by the installer is placed outdoors. This prevents erroneous switching from the basic operation plan creating section 2 to the special operation plan creating section 3, and ensures that settings are changed after the installer gives prior explanation to the customer.

Generally speaking, customers are reluctant to allow the installer to come inside of their houses. Since the maintenance-use operating portion 11 is placed outdoors, the installer can change settings only through outdoor work.

As described above, in the fuel cell system according to the present embodiment, the operation plan selecting section 4 in the configuration according to Embodiment 1 or Embodiment 2 is included in a main body setting portion (the maintenance-use operating portion 11) of the fuel cell main body 10.

Accordingly, the operation of the fuel cell 1 based on the basic operation plan can be switched to the operation of the fuel cell 1 based on the special operation plan, or vice versa, by means of the main body setting portion (the maintenance-use operating portion 11) of the fuel cell main body 10, which is normally installed outdoors and is very unlikely to be operated by the user.

Since the operation plan selecting section 4 is included in the main body setting portion (the maintenance-use operating portion 11) of the fuel cell main body 10, the operation plan selecting section 4 is very unlikely to be operated by the user. When the user feels dissatisfied with the operation of the fuel cell 1 based on the basic operation plan regarding either the operating time (e.g., maximum 11 hours) of the fuel cell 1 per predetermined unit period (e.g., per day) or the number of start-ups (e.g., once) of the fuel cell 1 per predetermined unit period (e.g., per day), the installer explains to the user that although it is technically possible to ease the restriction regarding the operating time or the number of start-ups, such ease of the restriction will result in that the end of equipment life is reached before the elapse of the durable years (e.g., 10 years). With the user's agreement (consent) on this matter, the installer switches the operation of the fuel cell 1 to the operation based on the special operation plan by means of the operation plan selecting section 4 of the main body setting portion (the maintenance-use operating portion 11) of the fuel cell main body 10. This makes it possible to prevent an occurrence of the user's dissatisfaction or a trouble in a case where the fuel cell 1 stops when the end of equipment life is reached earlier than originally scheduled.

Embodiment 4

Figure 6:
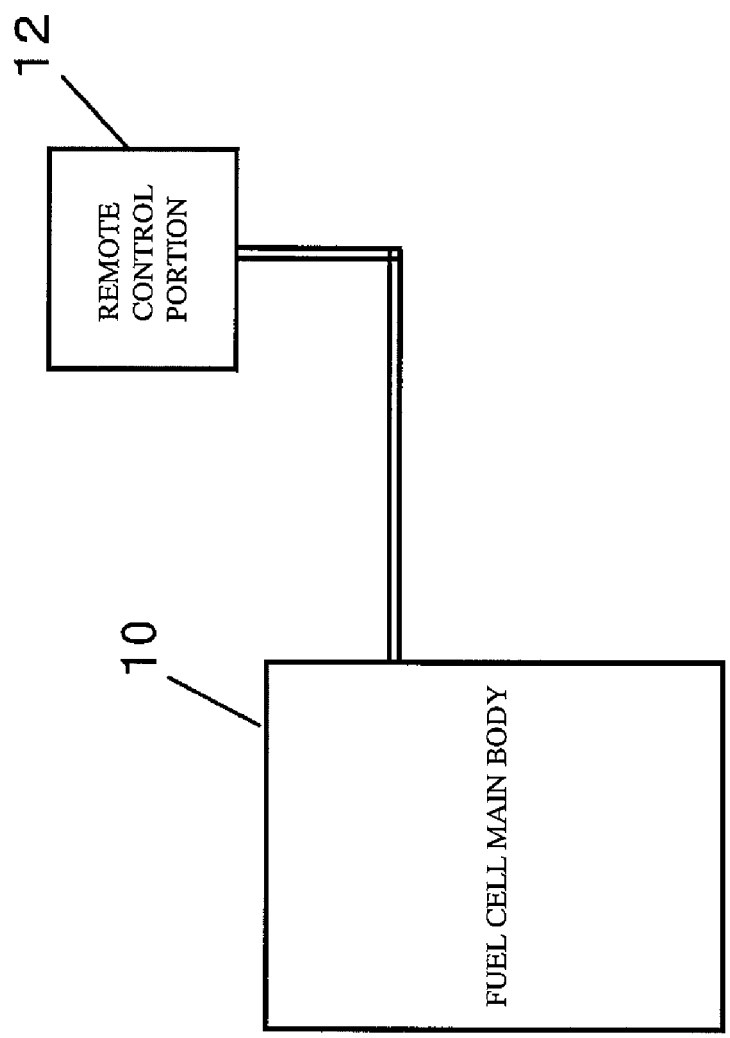
FIG. 6 is a configuration diagram showing an example of a schematic configuration of a fuel cell system according to Embodiment 4 of the present invention.

FIG. 6 is a configuration diagram of a fuel cell system according to Embodiment 4 of the present invention.

As shown in FIG. 6, the fuel cell system according to the present embodiment is configured such that the configuration according to Embodiment 1 or Embodiment 2 includes: the fuel cell main body 10 (the fuel cell system according to Embodiment 1 or Embodiment 2); and the remote control portion 12 placed indoors and electrically connected to the fuel cell main body 10.

Here, the operation plan selecting section 4, which is configured to select between the basic operation plan creating section 2 and the special operation plan creating section 3 described in Embodiment 1 or Embodiment 2, can be placed in the remote control portion 12. However, it is necessary that the operation plan selecting section 4 is normally rendered inoperable by a customer since the setting to select the special operation plan creating section 3 is performed by the installer in response to a customer request, with the customer's agreement that the equipment life will be shortened. For example, the operation plan selecting section 4 may be rendered inoperable by the customer, by requiring password authentication at entry into an operation plan selection screen or requiring a special operation (e.g., multiple pressing of a switch) to be performed.

With this configuration, the same advantageous effects as those described in Embodiment 3 can be obtained, and in addition, the operation plan selecting section 4 can be realized with a simpler configuration without specially including the maintenance-use operating portion 11.

As described above, in the fuel cell system according to the present embodiment, the operation plan selecting section 4 in the configuration according to Embodiment 1 or Embodiment 2 is included in the remote control portion (the remote control portion 12) installed indoors.

Accordingly, the operation of the fuel cell 1 based on the basic operation plan can be switched to the operation of the fuel cell 1 based on the special operation plan, or vice versa, by means of the remote control portion (the remote control portion 12) installed indoors.

It is desired that the selection by means of the operation plan selecting section 4 is rendered unperformable by the user through a normal operation using the remote control portion (the remote control portion 12), but performable only by the installer through a special operation. This makes it possible to prevent an occurrence of a situation where the user switches the operation of the fuel cell 1 to the operation based on the special operation plan, without understanding that the equipment life will be shortened. When the user feels dissatisfied with the operation of the fuel cell 1 based on the basic operation plan regarding either the operating time (e.g., maximum 11 hours) of the fuel cell per predetermined unit period (e.g., per day) or the number of start-ups (e.g., once) of the fuel cell per predetermined unit period (e.g., per day), the installer explains to the user that although it is technically possible to ease the restriction regarding the operating time or the number of start-ups, such ease of the restriction will result in that the end of equipment life is reached before the elapse of the durable years (e.g., 10 years). With the user's agreement (consent) on this matter, the installer switches the operation of the fuel cell 1 to the operation based on the special operation plan by means of the operation plan selecting section 4 of the remote control portion (the remote control portion 12). This makes it possible to prevent an occurrence of the user's dissatisfaction or a trouble in a case where the fuel cell 1 stops when the end of equipment life is reached earlier than originally scheduled.

INDUSTRIAL APPLICABILITY

According to the present invention, if a user is dissatisfied with the operation of a fuel cell based on a conventional basic operation plan due to short power generation hours and demands for increased opportunities for electric power generation, agreeing that the number of years for which the fuel cell stays operable will be reduced, such a demand from the user can be met. In addition, assume that there is a user who wishes their power generation request to be always accepted, agreeing that the number of years for which the fuel cell stays operable will be reduced. For such a user, a system can be provided which is configured to accept a power generation instruction even after electric power generation for the day has ended. Thus, for example, the present invention is suitably applicable to fuel cell systems used in such cases as follows: a case where a professional-use fuel cell system is used, in which case the number of years for which the fuel cell stays operable is allowed to be less than usual; and a case where a user places a priority on allowing the fuel cell to generate electric power all day rather than on extending the number of years for which the fuel cell stays operable.

REFERENCE SIGNS LIST

1 fuel cell
2 basic operation plan creating section
3 special operation plan creating section
4 operation plan selecting section
5 fuel cell operating section
6 power demand predicting section
7 thermal demand predicting section
8 allowable operating time setting section
9 allowable number of start-ups setting section
10 fuel cell main body
11 maintenance-use operating portion
12 remote control portion

The invention claimed is:

1. A method of operating a fuel cell system including a fuel cell unit configured to supply electricity and heat, the method comprising:
   a step of stopping operation of the fuel cell system in at least one of the following cases: a case where an operating time has reached a durable operating time, a case where a number of start-ups has reached a number of durable start-ups, and a case where a duration of equipment use has reached durable years;
   a basic operation plan creating step of creating a basic operation plan based on the durable years and at least one of the durable operating time and the number of durable start-ups of the fuel cell unit, such that the fuel cell unit is operated within a range of at least one of the first allowable operating time and the first allowable number of start-ups per predetermined unit period;
   a special operation plan creating step of creating a special operation plan such that the fuel cell unit is operated within a range of at least one of a second allowable operating time and a second allowable number of start-ups per predetermined unit period, the second allowable operating time being longer than the first allowable operating time and being set such that the operating time reaches the durable operating time before elapse of the durable years, the second allowable number of start-ups being greater than the first allowable number of start-ups and being set such that the number of start-ups reaches the number of durable start-ups before elapse of the durable years;
   an operation plan selecting step of selecting one of the basic operation plan and the special operation plan; and
   a fuel cell operating step of operating the fuel cell unit based on an operation plan selected in the operation plan selecting step.

2. The method of operating the fuel cell system according to claim 1, comprising:
   a power utilizing step of utilizing electric power generated by the fuel cell unit;
   a power demand predicting step of predicting a power demand for electric power to be used;
   a heat utilizing step of storing hot water heated by utilizing heat generated when the electric power is generated and using the hot water;
   a thermal demand predicting step of predicting a hot water demand for hot water to be used; and
   either an allowable operating time setting step of setting the second allowable operating time in accordance with at least one of the power demand and the hot water demand, or an allowable number of start-ups setting step of setting the second allowable number of start-ups in accordance with at least one of the power demand and the hot water demand.

3. The method of operating the fuel cell system according to claim 2, wherein
   the allowable operating time setting step includes setting the first allowable operating time and the second allowable operating time in accordance with at least one of the power demand and the hot water demand.

4. The method of operating the fuel cell system according to claim 2, wherein
   the allowable number of start-ups setting step includes setting the first allowable number of start-ups and the second allowable number of start-ups in accordance with at least one of the power demand and the hot water demand.

5. A method of operating a fuel cell system including a fuel cell unit configured to supply electricity and heat, the method comprising:
   a fuel cell operating step of operating the fuel cell unit based on an operation plan, the operation plan being such that the fuel cell unit is operated within a range of at least one of an allowable operating time and an allowable number of start-ups per predetermined unit period, the allowable operating time being set such that a total operating time reaches a durable operating time of the fuel cell before elapse of durable years of the fuel cell, the allowable number of start-ups being set such that a total number of start-ups reaches a number of durable start-ups of the fuel cell before elapse of the durable years; and a step of stopping operation of the fuel cell system in at least one of the following cases: a case where the total operating time has reached the durable operating time, and a case where the total number of start-ups has reached the number of durable start-ups.

* * * * *